United States Patent [19]

Asahina et al.

[11] Patent Number: 4,674,108
[45] Date of Patent: Jun. 16, 1987

[54] DIGITAL X-RAY MEDICAL DIAGNOSTIC APPARATUS

[75] Inventors: Hiroshi Asahina, Tochigi; Ichiro Ogura, Ootawara, both of Japan

[73] Assignee: Kabushiki Kaisha Toshiba, Kawasaki, Japan

[21] Appl. No.: 751,131

[22] Filed: Jul. 2, 1985

[30] Foreign Application Priority Data

Jul. 3, 1984 [JP] Japan ................. 59-137820

[51] Int. Cl.⁴ .............................................. H05G 1/64
[52] U.S. Cl. ........................................ 378/99; 358/111
[58] Field of Search ........................... 378/99; 358/111

[56] References Cited

U.S. PATENT DOCUMENTS 4,204,226 5/1978 Mistretta et al. .
4,323,973 4/1982 Greenfield ........................... 358/111
4,423,521 12/1983 Haendle et al. ..................... 378/108

FOREIGN PATENT DOCUMENTS 0092767 11/1983 European Pat. Off. .
0092940 12/1983 European Pat. Off. .
3106627 9/1982 Fed. Rep. of Germany .
0153589 12/1979 Japan .................................... 378/99
0013537 1/1980 Japan .................................. 358/111
0095146 7/1980 Japan .................................... 378/99

Primary Examiner—Craig E. Church
Assistant Examiner—David P. Porta
Attorney, Agent, or Firm—Finnegan, Henderson, Farabow, Garrett & Dunner

[57] ABSTRACT

An X-ray photographing device of a digital fluorographic apparatus for use in X-ray diagnosis includes an image intensifier for converting X-rays transmitted through an object to an optical image, and a TV camera for converting the optical image to a television video signal. An effective video level range of the TV camera is narrower than that of the image intensifier. In order to perform a proper X-ray transmittance correction for the object, an X-ray television video signal is converted, at levels out of the effective video level range of the TV camera, to a maximum allowable input video level. In a TV monitor, the levels of the television signal which are out of the effective video signal level range of the TV camera are displayed at the maximum signal level to permit a ready transmittance correction operation. The subtraction image is displayed in accordance with the proper corrected levels.

5 Claims, 4 Drawing Figures

F I G. 2A
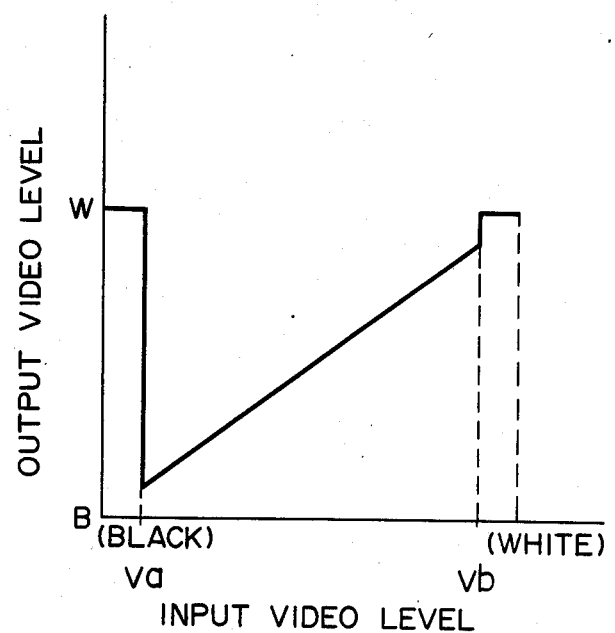
F I G. 2B
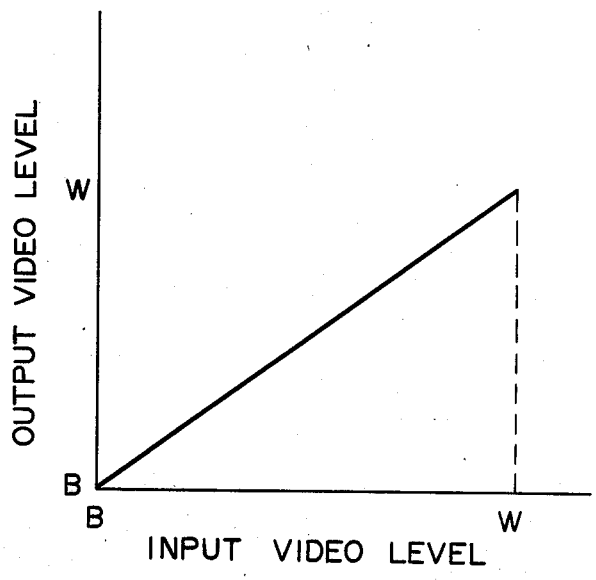

DIGITAL X-RAY MEDICAL DIAGNOSTIC APPARATUS

BACKGROUND OF THE INVENTION

This invention relates to a digital diagnostic apparatus using digital X-ray image data for medical diagnosis.

In general, a digital X-ray diagnostic apparatus comprises an image intensifier to convert a transmitting X-ray image from an object (patient) into a visible light image, a television camera to convert the light image into an analog television video signal, an analog-to-digital converter to convert the analog video signal into a digital video signal, and a digital memory to store the digital video signal. The digital video signal stored in the memory can be read out at a high speed when necessary, thus providing an image of the object to facilitate diagnosis.

In recent years, a digital fluorography apparatus capable of removing image information (for example, bones) unnecessary for diagnosis through a data subtraction process, has been attracting attention.

The digital fluorographic apparatus includes an X-ray photographing device, an image processing unit for processing an X-ray image information signal from the X-ray photographing device, and a display unit for displaying the processed image information. The X-ray photographing device includes an X-ray tube, an image intensifier (I.I.) for converting a X-ray image of an object into a visible light image, and a TV camera for converting the light image to a television signal. The image processing unit is adapted to convert the television signal representing the X-ray image of the object from the TV camera to a digital information signal; to subtractively combine an image information signal obtained before the injection of an X-ray contrast medium into the object with an image information signal obtained after the injection of the contrast medium, and to convert the subtraction image information signal to an analog information signal to permit it to be displayed on a TV monitor.

In the X-ray photographing device, the dynamic range (effective video signal level range) of the TV camera is narrower than that of the image intensifier. There is also a limit on the dynamic range of an A/D converter in the image processing unit. The maximum allowable input level of the A/D converter is set at the maximum allowable input level of the TV camera.

If the signal level of the optical image of the image intensifier deviates from the effective video signal level range of the TV camera, an optimum image is not obtained. For example, halation occurs on the display screen with respect to the white level of the video signal, and the system fails to obtain a detailed image of the corresponding area. To display an optimum X-ray image on the screen of the TV monitor, it is important to set the apparatus at the optimum X-ray generation conditions. In the prior art apparatus, before the execution of subtraction image processing, test X-rays are directed to the object, and the video signal obtained from the X-ray TV camera is sampled. The X-ray generation conditions are then optimally controlled based on the level of the video signal thus sampled. In this way, feedback control is obtained.

Normally, tissues of a human body are not uniform in the regions of interest to which the digital fluorographic apparatus is applied. Even if a system is designed so that the X-ray conditions are automatically set, it would be difficult to obtain optimum video signal levels over the whole display screen. For this reason, corrective operations must be performed, for example material of a low transmittance is inserted as a corrective filter into a site of a high X-ray transmittance, to obtain a uniform transmittance over the whole display screen.

However, since the X-ray transmittance of each region of interest of the body is not known, it is necessary for the operator to repeatedly perform the corrective operations while observing resultant images. This causes the body to be exposed to a greater dosage of X-rays than is desirable.

SUMMARY OF THE INVENTION

An object of this invention is to provide an improved digital medical diagnostic apparatus.

Another object of this invention is to provide a digital fluorographic apparatus which can operate without applying a large dosage of X-rays to an object.

Still another object of this invention is to provide a digital fluorographic apparatus which can readily perform a transmittance-corrective operation.

An apparatus of this invention comprises an X-ray photographing device including an X-ray tube for directing X-rays to an object, an image intensifier for converting an image formed by X-rays transmitted through the object into a visible light image, and a television camera for transforming the light image into a television signal, the television camera having an effective signal level range, between a minimum allowable input signal level and a maximum allowable input signal level, which is narrower than that of the image intensifier. The apparatus also comprises a digital image processing unit including an analog-to-digital converter for converting the analog television signal into a digital television signal, a digital memory for temporarily storing the digital television signal and from which the digital television signal can be read out at a desired time, a digital-to-analog converter for converting the digital television signal read out of the digital memory into an analog television signal, and an image display device for visually displaying the analog television signal from the digital image processing unit.

The objects of this invention can be attained by the provision of a video signal level converting means in the digital image processing unit for converting signal levels of the television signal which are out of the effective video signal level range of the television camera to a maximum level of the television signal.

BRIEF DESCRIPTION OF THE DRAWINGS

FIGS. 2A and 2B show input/output characteristics of the video signal level converters 12b and 12c of FIG. 1, respectively.

DETAILED DESCRIPTION OF THE PREFERRED EMBODIMENTS

Figure 1:
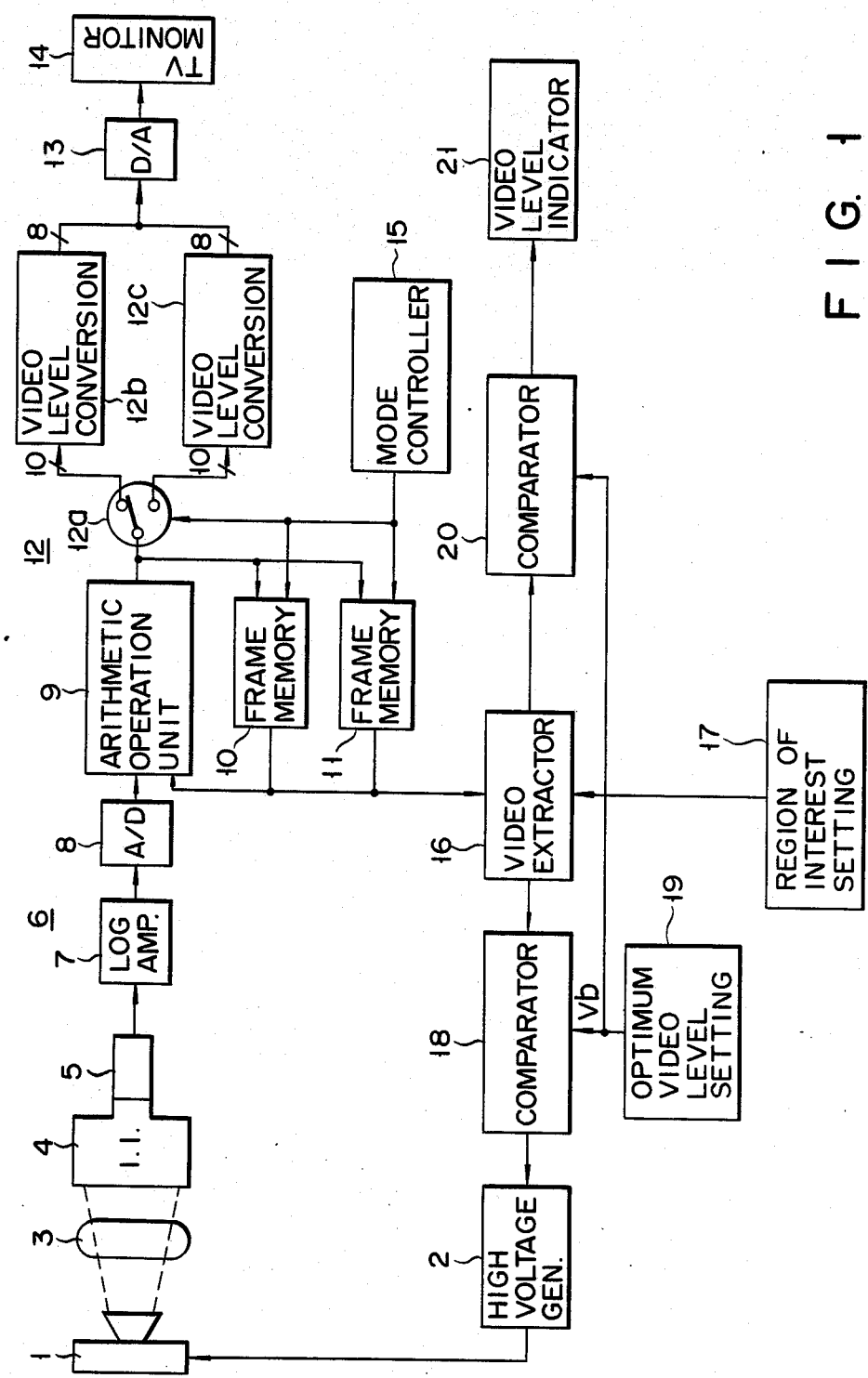
FIG. 1 shows an arrangement of a digital fluorography apparatus embodying this invention.

FIG. 1 shows a digital fluorography apparatus embodying this invention. An X-ray tube 1 is powered from a high voltage generator 2 to permit X-rays to be directed to an object 3. The X-rays which penetrate the object 3 are received by an image intensifier 4 to convert an X-ray image to a visible optical image. The optical image which is obtained by the image intensifier 4 is picked up by a TV camera 5 and converted to a TV video signal. As set out above, the dynamic range of a pickup type in the TV camera is narrower than that of the image intensifier 4.

A video signal obtained by the TV camera 5 is applied to an image processing unit 6. The image processing unit 6 permits the A/D conversion of the video signal, a subtraction operation of video signals, and the D/A conversion of a subtraction video signal. According to this invention, the image processing unit also performs video signal level conversion processing to enhance an image during a transmittance correction operation to be described later.

In the image processing unit 6, the video signal from the TV camera 5 is subjected, in a logarithmic amplifier 7, to a logarithmic conversion. An output signal of the logarithmic amplifier 7 is converted by an A/D converter 8 to a digital video signal which is, in turn, applied to an arithmetic operation unit 9 which performs, for example, a subtraction or a sum-of-products operation. First and second frame memories 10 and 11 are coupled to the arithmetic unit 9. In the DSA inspection, the first frame memory 10 stores a mask image before the injection of an X-ray contrast medium, and the second frame memory 11 stores an X-ray image after the injection of the X-ray contrast medium into the object. The image information of the first and second frame memories 10 and 11 is applied to the arithmetic unit 9 where the X-ray image, after the injection of the X-ray contrast medium into the object, is subtracted from the mask image.

The output signal of the arithmetic unit 9 is applied to a video signal level converter for image enhancement. In the illustrative example, the video level converter 12 includes a switch circuit 12a and first and second video level converting circuits 12b and 12c. The output signal of the arithmetic unit 9 is selectively applied to either of the first and second video level converting circuits 12b and 12c. The output signal of the video level converter is converted by a D/A converter 13 to an analog video signal. The analog video signal is visually displayed on a TV monitor 14.

The first video level converting circuit 12b has an input/output characteristic for image enhancement as shown in FIG. 2A, while the second video level conversion circuit 12c has an input/output characteristic as shown in FIG. 2B.

In the transmittance correction mode, the video signal resulting from the test X-rays is supplied through the arithmetic unit 9 to the first video level converting circuit 12b, and in the DSA inspection mode the subtraction video information obtained at the arithmetic unit 9 is supplied to the second video level converting circuit 12c. The selective application of the output signal of the arithmetic unit 9 to the first and second frame memories 10 and 11 is controlled by the processing mode controller 15. The switch circuit 12a is also controlled by the processing mode controller 15. The characteristic of the video level converter 12 for image enhancement will be set forth below.

A digital video signal from one of the first and second frame memories 10 and 11 is delivered to a video signal extractor 16 which extracts video information corresponding to a region of interest (ROI) as set by an ROI setting unit 17. The extracted video information is compared, by a comparator 18, with an optimum level, as in the case of the known apparatus, to deliver an optimum amount of control to a high voltage generator 2. In this way, a supply voltage, anode current, and X-ray generation time for the X-ray tube are set at an optimum level.

FIG. 2A shows the input/output characteristic of the first video level converting circuit 12b, and FIG. 2B shows the input/output characteristic of the second video level converting circuit 12c. In FIGS. 2A and 2B, the abscissa indicates an input video level represented by 10 bits while the ordinate indicates an output video level represented by 8 bits. Note that the levels indicated by Va and Vb denote the minimum and maximum allowable input signal levels, respectively. The effective video signal level range, i.e., a difference between the minimum and maximum allowable input signal levels, is narrower than the effective video signal level range of the image intensifier. As can be appreciated from FIG. 2A, the first video level converting circuit 12b converts a video signal level below the minimum allowable input level, as well as a video signal level above the maximum input allowable level, to a maximum video level (a white peak level), resulting in a partial enhancement of the X-ray image. The optimum set level which is supplied to the comparator 18 corresponds to the maximum allowable input level Vb in FIG. 2A. In the inspection mode, conversely, the second video level converting circuit 12c for receiving the subtraction image has a linear characteristic over a range from a black peak level to a white peak level. It is desirable for the first video level converting circuit 12b *perform a video signal level enhancement at the low and high levels of the video level range, as indicated in FIG. 2A. However, the video signal level may be enhanced at either the low or high level.*

The first and second video level converting circuits can each be constituted by a (ROM). That is, an input video signal is used as an address signal, while an output video signal, corresponding to the input signal, is stored in a corresponding memory location designated by the address signal. Alternatively, the first and second video level converting circuits may be constituted by a single random access memory (RAM). In this case, conversion data having the characteristics shown in FIGS. 2A and 2B may be selectively written by a microprocessor in accordance with the processing mode.

Referring to FIG. 1, the video signal extractor 16 is responsive to coordinate data from the ROI setting unit 17 to deliver an extracted video signal to the comparator 20 where it is compared with the optimum set value Vb. The comparator 20 produces a comparison value, for example, as a percentage, for display on a video level indicator 21.

Figure 3:
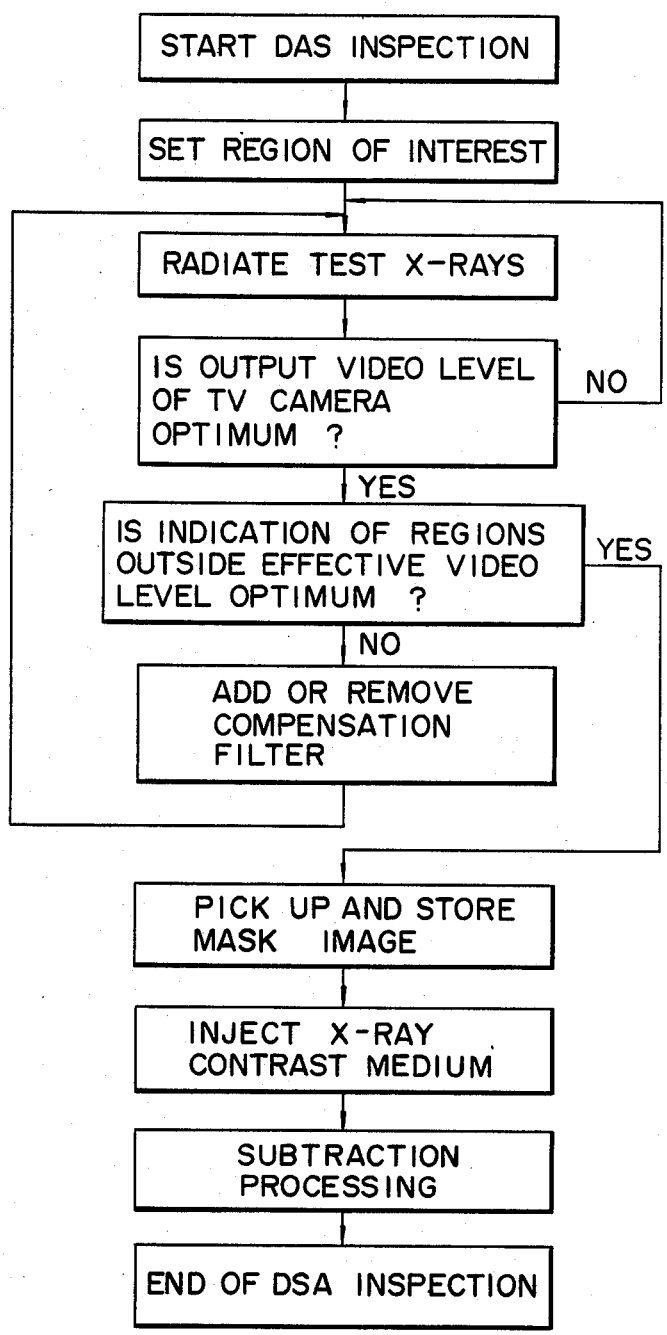
FIG. 3 shows a flow chart of a Digital Subtraction Angiography (DSA) inspection using the apparatus of this invention.

The operation of the digital fluorography apparatus will now be explained with reference to the flow chart for DSA inspection in FIG. 3.

The DSA inspection involves a transmittance correction mode and a DSA inspection mode. In the transmittance correction mode, the mode controller 15 couples the input of the first frame memory 10 to the arithmetic operation unit 9. The output of the arithmetic unit 9 is coupled through the switch circuit 12a to the first video level converting circuit 12b. At the start of inspection, the operator sets a ROI area through the manipulation of the ROI setting unit 17. As a result, the coordinate data on the ROI area is applied to the video extractor 16 in preparing to extract the video information of the ROI area from the video information of the frame memory 10.

The X-rays are directed, under an arbitrary condition, toward the object. The video information signal representing an image, formed of X-rays transmitted through the object, is supplied through the arithmetic unit 9 to the frame memory 10 where it is stored. The video information is supplied to the video extractor 16 where ROI video information is extracted. The extracted video information is supplied to the comparator 20 for comparison with the optimum value Vb. At the comparison step, the test X-ray irradiation is repeated until the maximum video level of the extracted video information becomes equal to the maximum allowable video input level of TV camera 5. This state can be visually observed on the video level indicator 21. At the end of this operation, the object image is stored in the frame memory 10 at the optimum video level.

The image information stored in the frame memory 10 is then supplied to the first video level converting circuit 12b. The video signals above the maximum allowable input level Vb and below the minimum allowable input level Va are converted to a maximum video level (a white peak value). In this way, the signals outside of the effective video level range of the TV camera 5 are indicated by white on the screen of the TV monitor 14.

It is obvious that it is not possible to observe the area of the object indicated by white on the screen and representive of the maximum video level. The operator, therefore, inserts or removes a correction filter in the maximum video level areas while observing the TV monitor 14. Thus, the X-ray transmittance can be made as uniform as possible over the whole screen. This operation enables the white regions on the screen to be clearly observed. In this transmittance correction mode, it is possible to perform a proper transmittance correction by virtue of an image enhancement process in the first video level converting circuit.

In the inspection mode, the mode controller 15 couples the output of the arithmetic unit 9 to the second frame memory 11 through the switch circuit 12a. The first frame memory 10 remains connected to the arithmetic unit 9. A mask image of the object, i.e. obtained before the injection of the X-ray contrast medium, is picked up and stored in the first frame memory 10. The controller 15 then permits the input of the second frame memory 11 to be coupled to the arithmetic unit. After the injection of the contrast medium, the X-ray image is photographed and stored in the second frame memory 11.

The image information which is stored in the first and second frame memories 10 and 11 is sequentially supplied to the arithmetic unit 9 where the subtraction process is carried out. The resultant subtraction image is supplied through the second video level converting circuit 12c to the TV monitor 14 where it is displayed. Since the second video level converting circuit 12c has a linear input/output characteristic, as set out above, it is possible to observe the subtraction image at proper video levels.

The invention can also be applied to the conventional X-ray diagnostic apparatus which does not perform the above-mentioned subtraction processing but only uses a digital memory. In this case, either the frame memory 10 or memory 11 suffices.

What is claimed is:

1. A digital X-ray diagnostic apparatus comprising:
   an X-ray photographic device including an X-ray tube for directing X-rays to an object, an image intensifier for converting an image formed by X-rays transmitted through the object into a visible light image, and a television camera for transforming the light image into an analog video signal;
   a digital image processing unit including,
      analog-to-to digital converting means for converting said analog video signal into a digital video signal,
   digital memory means for storing said digital video signal,
   digital-to-analog converting means for converting said digital video signal read out from said digital memory means into an analog video monitor signal, and
   video signal level converting means for converting the level of said digital video signal to a maximum brightness level of said television camera when said digital video signal is outside of a predetermined reference range governed by the operating range characteristics of said television camera; and
   an image display device for visually displaying the analog video monitor signal from said digital image processsing unit.

2. An apparatus according to claim 1, wherein:
   said image intensifier has an effective signal level range;
   said predetermined reference range is an effective video signal level range of said television camera between a minimum allowable input signal level and a maximum allowable input signal level, said video signal level range being narrower than the signal level range of said image intensifier; and
   said maximum brightness level of said television camera corresponds to said maximum allowable input signal level.

3. The apparatus according to claim 2, wherein said digital image processing unit includes:
   video sampling means for sampling a portion of said digital video signal corresponding to a region of interest of the object prior to conversion by said video signal level converting means and by said digital-to-analog conversion means, and
   means for obtaining a ratio of the level of said sampled portion of said digital video signal to said maximum allowable input level of said television camera.

4. An apparatus according to claim 3, further comprising means for visually displaying said ratio.

5. An apparatus according to claim 1, wherein said digital image processing unit further includes an arithmetic operation unit for carrying out, in a subtraction processing mode, an arithmetic operation of subtraction between said digital video signal of an X-ray image of the object obtained before the injection of an X-ray contrast medium into the object and said digital video signal of an X-ray image obtained after the X-ray contrast medium injection.

* * * * *

UNITED STATES PATENT AND TRADEMARK OFFICE
CERTIFICATE OF CORRECTION

PATENT NO. : 4,674,108

DATED : June 16, 1987

INVENTOR(S) : Hiroshi Asahina, et al

It is certified that error appears in the above-identified patent and that said Letters Patent is hereby corrected as shown below:

In Claim 1, line 12, change:

"analog-to-to" to --analog-to--

Signed and Sealed this

First Day of March, 1988

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,674,108

DATED : June 16, 1987

INVENTOR(S) : Hiroshi Asahina, et al

It is certified that error appears in the above-identified patent and that said Letters Patent is hereby corrected as shown below:

In Claim 1, line 9, change:
"analog-to-to" to --analog-to--.

This certificate supersedes Certificat of Correction March 1, 1988.

Signed and Sealed this

Twenty-second Day of May, 1990

Attest:

HARRY F. MANBECK, JR.

*Attesting Officer*　　*Commissioner of Patents and Trademarks*